United States Patent
Enkerud et al.

(10) Patent No.: US 9,361,002 B2
(45) Date of Patent: Jun. 7, 2016

(54) METHOD FOR LOADING AND DISPLAYING DIFFERENT PROCESS DISPLAYS ON A USER INTERFACE OF AN INDUSTRIAL CONTROL SYSTEM

(75) Inventors: Torgeir Enkerud, Oslo (NO); Kristoffer Husoy, Oslo (NO); Charlotte Skourup, Drammen (NO)

(73) Assignee: ABB RESEARCH LTD., Zürich (CH)

( * ) Notice: Subject to any disclaimer, the term of this patent is extended or adjusted under 35 U.S.C. 154(b) by 1097 days.

(21) Appl. No.: 12/528,996

(22) PCT Filed: Feb. 19, 2008

(86) PCT No.: PCT/EP2008/051977
§ 371 (c)(1),
(2), (4) Date: Aug. 27, 2009

(87) PCT Pub. No.: WO2008/104477
PCT Pub. Date: Sep. 4, 2008

(65) Prior Publication Data
US 2010/0088627 A1  Apr. 8, 2010

(30) Foreign Application Priority Data

Feb. 27, 2007  (EP) .................................... 07103132

(51) Int. Cl.
*G06F 3/00* (2006.01)
*G06F 3/0484* (2013.01)
(Continued)

(52) U.S. Cl.
CPC ............ *G06F 3/0484* (2013.01); *G06F 9/4443* (2013.01); *G06F 3/0481* (2013.01)

(58) Field of Classification Search
CPC ...................................................... G06F 3/0481

USPC ......................................... 715/827, 736, 777
See application file for complete search history.

(56) References Cited

U.S. PATENT DOCUMENTS

| | | | |
|---|---|---|---|
| 5,509,116 A | 4/1996 | Hiraga et al. | |
| 6,002,398 A | 12/1999 | Wilson | |

(Continued)

FOREIGN PATENT DOCUMENTS

| | | | |
|---|---|---|---|
| EP | 660219 A2 | 6/1995 | |
| EP | 1283484 A2 | 2/2003 | |

(Continued)

OTHER PUBLICATIONS

PCT/ISA/210—International Search Report—Sep. 3, 2008.
(Continued)

*Primary Examiner* — Ryan Pitaro
(74) *Attorney, Agent, or Firm* — Venable LLP; Eric J. Franklin

(57) ABSTRACT

A method for providing an improved user navigation interface for an industrial control system. The system includes a computer and a display device and a computer implemented workplace application. The system also includes a plurality of process control interfaces displayed on the display device. The process control interfaces include one or more software objects for controlling and/or monitoring objects controlled by the control system. The method includes displaying in the user interface a set of the process control interfaces generated by one instance of the workplace application in a designated view that includes a corresponding set of graphic user interface objects. Each graphic user interface object identifies and, on selection, displays the corresponding the process control interface. By selecting a first or second graphic user interface objects, a user can switch between a display of a first process control interface and a display of the second process control interface provided by the same instance of the workplace application. A graphic user interface, a system and a computer program for carrying out the method are also described.

28 Claims, 6 Drawing Sheets

(51) Int. Cl.
  *G06F 9/44* (2006.01)
  *G06F 3/0481* (2013.01)

(56) References Cited

U.S. PATENT DOCUMENTS

| | | | |
|---|---|---|---|
| 6,542,796 | B1 | 4/2003 | Gibbs et al. |
| 6,738,061 | B2 * | 5/2004 | Suzuki ............................ 345/422 |
| 7,165,221 | B2 * | 1/2007 | Monteleone et al. .......... 715/738 |
| 2002/0046290 | A1 | 4/2002 | Andersson et al. |
| 2002/0080181 | A1 * | 6/2002 | Razdow et al. ................ 345/772 |
| 2003/0028269 | A1 * | 2/2003 | Spriggs et al. ................... 700/83 |
| 2004/0085367 | A1 | 5/2004 | Hagarty, Jr. |
| 2005/0198247 | A1 * | 9/2005 | Perry et al. ..................... 709/223 |
| 2006/0206834 | A1 * | 9/2006 | Fisher et al. ................... 715/777 |
| 2006/0230356 | A1 * | 10/2006 | Sauve et al. .................... 715/777 |
| 2007/0132779 | A1 * | 6/2007 | Gilbert et al. .................. 345/619 |
| 2007/0260982 | A1 * | 11/2007 | Wayland et al. ............... 715/700 |
| 2008/0066004 | A1 * | 3/2008 | Blevins et al. ................. 715/771 |
| 2008/0077936 | A1 * | 3/2008 | Goel et al. ...................... 719/312 |
| 2010/0313148 | A1 * | 12/2010 | Hochendoner et al. ........ 715/759 |
| 2011/0072387 | A1 * | 3/2011 | Fisher et al. ................... 715/777 |
| 2011/0102679 | A1 * | 5/2011 | Relan et al. .................... 348/584 |

FOREIGN PATENT DOCUMENTS

| | | |
|---|---|---|
| EP | 1376323 A1 | 1/2004 |
| WO | WO-01/02953 A1 | 1/2001 |
| WO | WO-01/15014 A2 | 3/2001 |
| WO | WO-2006/096792 A2 | 9/2006 |
| WO | WO-2006/103541 A1 | 10/2006 |

OTHER PUBLICATIONS

PCT/ISA/237—Written Opinion of the Internatinal Searching Authority—Sep. 3, 2008.

* cited by examiner

METHOD FOR LOADING AND DISPLAYING DIFFERENT PROCESS DISPLAYS ON A USER INTERFACE OF AN INDUSTRIAL CONTROL SYSTEM

CROSS-REFERENCE TO RELATED APPLICATIONS

This application claims priority to European patent application 07103132.2 filed 27 Feb. 2007 and is the national phase under 35 U.S.C. § 371 of PCT/EP2008/051977 filed 19 Feb. 2008.

TECHNICAL FIELD

The invention concerns method and system for automatically providing an improved user interface in an industrial control system. In particular the invention provides improved navigation to a graphic user interface for monitoring or controlling a part of an industrial control system.

TECHNICAL BACKGROUND

In the supervisory control of industrial plants there is continual and generally increasing requirement for information about plant equipment, current and historic process data, trends, etc. This information is typically provided by the control system and usually in the form of one or more distributed control systems (DCS) and/or supervisory control and data acquisition (SCADA) systems. With the increases in computing power and advances in communication and computerized measurement there is an increasing amount of data available for the operators.

The information is often presented to the operators through a display screen showing process graphics that presents process data (measurements, values), tag identifiers, equipment ID, alarm status, connections between plant equipment, etc. As more and more data is presented to the operators, the visual user interfaces each often hold very much information.

The task of finding the relevant technical information for a given technical subject or condition in a large information space is further complicated by the fact that in many situations the operator often has limited time available to make a decision. The significance of the information available will vary with the current situation. That is, users of industrial control systems have to deal at least in part with a context sensitivity problem, as in some contexts certain information will be essential and in others irrelevant.

U.S. Pat. No. 6,542,796 entitled Methods and apparatus for integrating, organizing, and accessing flight planning and other data on multifunction cockpit displays, to Gibbs, assigned to Honeywell International Inc. describes methods for integrating, organizing, and accessing flight planning and other data on cockpit displays in aircraft. Different parts of a flight plan and/or information about different functions may be displayed in a series of windows each accessed by a selecting a known graphic display feature in computer systems called a tab.

In U.S. Pat. No. 6,002,398 entitled Navigation between property pages with tabs and menus, assigned to Novell, Inc., a method is described for displaying a tabbed dialog box, a property sheet, which has at least one child window. The parent window or property sheet has a multiple associated, displayable child windows. However at run time the described program loads all of the objects, including graphics, for all the child windows after user initiates the action which represents a heavy load on processor, display and system resources at runtime.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

A feature of the method described in WO01/02953 is that aspect objects can be organized in structures. A structure of aspect objects is a hierarchy of object instances. It may be based on any type of relations between aspect object instances. An aspect object can be placed in several structures at the same time, where the different structures represent different relations, e.g. functional and physical containment (functional structure and location structure).

A further application of the method of WO01/02953 is described in US-2002-0046290-A1. A meta object representing an entity is typically represented in several hierarchical structures at the same time within a control system. For example, a certain piece of process equipment has a certain position in a functional structure depending on the functional breakdown of the plant. It has also a physical position, and thus it has a place in a location structure. The same piece of equipment may currently be allocated to a certain production order, so it belongs to an order structure. Because it is used to produce a certain product, it also fits in a product structure.

Finding the right information in control systems is often difficult because the information space is so large. There are often 10s of thousands of individual tag names and hundreds or thousands of process graphics, so that the task of navigation between control interfaces for different parts of processes is often difficult or time consuming. The most common navigation method is to have links arranged with or around the process graphics. The navigation methods are otherwise limited to back/forward and history, context menu, display shortcut buttons and the like. Although different navigation schemes have been proposed they often demand considerable additional engineering or considerable system resources, or both.

Operators and system engineers need to navigate as quickly as possible within the different objects, aspect and or windows of the process control workplace. Navigating wrongly and having poor ways of managing the windows or objects which means under normal operation increased operator fatigue, and can mean during unexpected events that seconds are lost and can potentially be the cause of a plant shutdown or an accident. For a system engineer, poor navigation systems can force him/her to adopt a non-optimal or non desirable workflow for engineering the system, causing both errors and increased engineering time.

SUMMARY OF THE INVENTION

According to an aspect of the present invention an improvement is provided in the form of a method for providing an engineering interface for an industrial control system comprising a computer and a display device and a computer implemented workplace application, said system further arranged with a plurality of process control interfaces comprising one or more software objects for controlling and/or monitoring an object controlled by said control system, and displayed on said display device, further comprising displaying in the user interface a set of said process control interfaces generated by one instance of said workplace application in a designated view, the designated view comprising a corresponding set of graphic user interface objects, where each graphic user interface object identifies and, on selection, displays the corresponding said process control interface by means of selecting a first or second graphic user interface object or tab, so switching between a display of a first process control interface and a display of a second process control interface in the same instance of said workplace application.

According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, the method further comprising maintaining the data of both the first designated view and a second designated view loaded in a computer memory According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, displaying the first said process control interface in the designated view with the first tab and the second tab and, on detection of a keyboard command or other predetermined computer input, switching between the first or second tabs, opening and displaying the corresponding first or second process control interface in the interface.

According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, displaying the designated view arranged with a plurality of tabs each linked to another process control interface and switching to any of the other process control interfaces by selecting a respective one of the plurality of tabs.

According to another embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, and by removing, on detecting a user input command to close a tab, the process control interface from said display and removing the data of the process control interface from a computer memory.

According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view and by closing, on detecting of a GUI input to the first tab or second tab of a designated view, or equivalent user input command, the first or second process control interface from said display and removing the data of the closed first or second process control interface from computer memory.

According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, by closing, on detecting a user input command to switch to another process control interface, the currently open view on said display in the designated view and retaining the data of the presently closed process control interface in computer memory, such that the data of the presently closed process control interface remains in memory and arranged with a link to a tab arranged in another designated view.

According to an embodiment of the present invention an improvement is provided in the form of a method for providing an engineering interface for an industrial control system comprising a computer and a display device and a computer implemented workplace application, further comprising displaying in the user interface a set of said process control interfaces generated by one instance of said workplace application in a designated view, and by on detecting a user input command directed to a link in the currently open process control interface on said display in the designated view and opening a new process control interface either inside the present window and replacing the currently open process control interface, or inside new a separate pane or view, depending on the user input.

According to an embodiment of the present invention an improvement is provided in the form of a method for providing an operator interface for an industrial control system comprising a computer and a display device and a computer implemented workplace application, said system further arranged with a plurality of process control interfaces comprising one or more software objects for controlling and/or monitoring an object controlled by said control system, and displayed on said display device, further comprising displaying in the user interface a set of said process control interfaces generated by one instance of said workplace application in a designated view, the designated view comprising a corresponding set of graphic user interface objects, where each graphic user interface object identifies and, on selection, displays the corresponding said process control interface by means of selecting a first or second graphic user interface object or tab, so switching between a display of a first process control interface and a display of a second process control interface in the same instance of said workplace application.

This invention describes using a designated view for navigational purposes in an industrial control system. The designated view is normally placed alongside a process graphic view, and contains visual objects or graphic user interface (GUI) objects that act as links to other views or panes within the application. The objects in the designated view will—when clicked—lead to a new control system object or aspect being presented visually to the user, hiding the previously displayed view or pane. The visual or GUI objects in the designated view can be aligned along one or more rows, and can have a variety of graphical appearances. The visual or GUI objects in the designated view can be tabs, buttons, ribbons, links, or other similar objects. For clarity, tabs will henceforth be used to signify any type of visual or GUI objects that can be used as links to other process graphics in the designated views.

Tabs are a set of visible graphic objects comprising one or more links to other views or panes within the application. Tabs are normally placed aligned along (one or more) edges (in one or more rows/alignments) of a process graphic. The tabs link to other open windows or panes within the same application, thereby providing a means to have several open windows or panes at the same time providing access to several views of the control system simultaneously.

Process graphics are the mainstay of the operational interface of most industrial control systems. All of the control objects are placed in a context of one or more process graphics. In traditional systems, these graphics can be displayed one at a time in each window, with or without the possibility of having overlapping windows. According to this invention, several process graphics can be open at the same time in one and the same workplace application, one in each tab of the application, providing efficient access to different views of the system.

According to another aspect of the present invention, the tabs can be related to a system, a state of the system, a specific user task, different types of users and to accompany specific user preferences as recorded for example in user profile, user or needs. On a system level it is important to relate the group of tabs to an application of the system or a task that is to be performed. In many cases a process graphic, or an object representation in the process graphic may be directly linked to a control object or a configuration setting. It is also possible to implement the invention as workplace-tailored navigation arrangements specific to the application or task to be performed. In specific workplaces the tabs are used to be able to access the appropriate information for the application or task and easily switch between a plurality of appropriate displays, or designated views. For example these may be operations such as start up, operate, change operation, alarm handling tasks, specific process related tasks, maintenance tasks, active or past work orders, emergency actions, shut down and so on.

In addition, the user interface may also be arranged for adaptation according to user preferences, system state or current work tasks. The advantage of an adaptable or adaptive function is that it also supports active exploration into the system by the operators.

Embodiments of the invention may advantageously be used for control purposes in a control system of an oil or gas production, storage, treatment or process installation. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy. Such an installation may comprise thousands of unique devices or tag names. It is a great advantage that process graphics might be 'stored' by the user in a tab for easy access in the future. This might be used as a means for determining which process graphics should be kept in working memory. These graphics would thus be quick to load into view.

The term a real world object is used in this description to describe a control object controlled by an industrial control system. The control object may be a real world object such as an actual apparatus object such as a pump, a motor, a valve, etc., or a more abstract object such as a purchase order, production batch, etc. The present invention is not limited to traditional control or process control areas. Any real world object may be represented, as a tangible or intangible object which is controlled in a process, including a device or process, or a person carrying out a stage or role in a process, or intangible objects such as messages, a location, status of information etc.

In a preferred embodiment of the methods of the invention one or more methods may be carried out by a computing device comprising one or more microprocessor units or computers. The control unit(s) comprises memory means for storing one or more computer programs for carrying out the improved methods. Preferably such computer program contains instructions for the processor to perform the method as mentioned above and described in more detail below.

DETAILED DESCRIPTION OF THE EMBODIMENTS

This invention describes a system for and a method of generating technical information comprising both static and dynamic data in industrial supervision, maintenance and control. The trend towards operation from remote operation centres introduces an increase in both the control room operators' work domain and the workload as several different processes can be supervised and controlled in parallel.

The designated view is normally placed alongside a process graphic view, and contains visual or GUI objects that act as links to other views of process graphics or other control system aspect or objects. The visual or GUI objects in the designated view will—when clicked—lead to a new pane or view being displayed to the user. The visual or GUI objects in the designated view can be aligned along one or more rows, and can have a variety of graphical appearances. The objects in the designated view can be tabs, buttons, ribbons, links, or other similar objects. For clarity, the word tabs will henceforth be used to signify any type of objects that can be used as links to other process graphics in the designated views.

Figure 1:
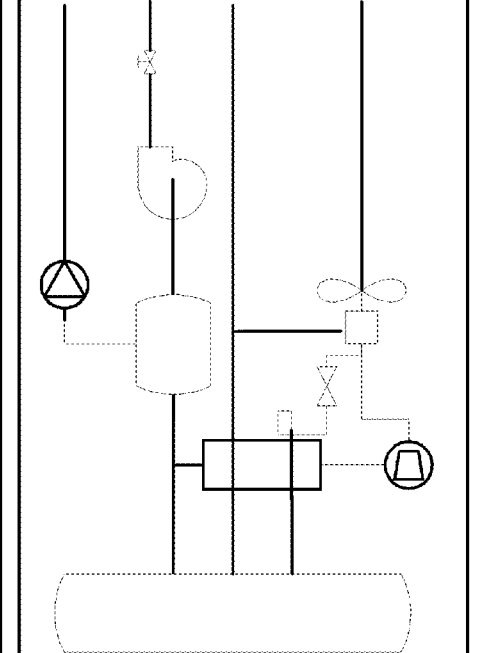
FIG. 1 shows an embodiment of an engineering interface.

FIG. 1 shows an engineering interface in which a display V1 which includes a view A1 of the plant explorer type, that is, a software that presents a tree-like structure of the software objects in a system, much like the Windows Explorer program available from Microsoft for their Windows™ based operating systems. FIG. 1 shows in one panel A1 of the display a tree structure in which one object HP Column is shown selected. A second panel A2 shows a list of objects contained in some way by HP Column, in which list an item "Picture" is shown selected by the graying or shadow. In a third part of the figure A3 a graphic or process graphic entitled Oil export compression pumps is displayed in a separate pane or panel. The whole display A1, A2 and A3 is arranged with a designated view and is thus arranged with tabs, shown in this figure, by way of example, only as four tabs. For example a tab 5a labeled Window 1 (oil pumps), left side, is displayed light coloured to indicate that it is selected and the three other tabs arranged here are shown as grayed, and not selected. Each of the Window tabs is also arranged with button 50, marked with an X, to close and/or remove a selected Window as a tab view from the display. This means that if the Window is open, closing the tab with eg button 50 closes the window.

In contrast to data belonging to a closed window, the data required for each tab view that is currently displayed, in this figure Window 1-Window 4, may in a default mode or operation be held still loaded in memory whether or not a tab view is presently active or selected one, and thus displayed, or not. The operator or engineer can jump as required from one window to another by selecting the desired tab while engaged in a task such as to inspect, interrogate or configure an object. The switch between data for tab views held in memory takes place very quickly with little additional resource load on the workstation or network. Engineering work is made simpler and more efficient because the engineer or other user can select individually, or optionally from an existing list, all the process graphics or other control interfaces that may be required for the present maintenance or configuration task etc, and then switch between just those selected graphics necessary to carry out and complete the task. This may be done using a single instance of the control system computer program(s) because each window currently arranged with a tab are kept loaded in memory as long as the tab view is opened and as long as the tab for that window has not been closed with the close X button 50. It is an advantage that the windows kept loaded in memory which is typically a local memory, and so network resources are not increased by moving between a succession of windows.

Figure 2:
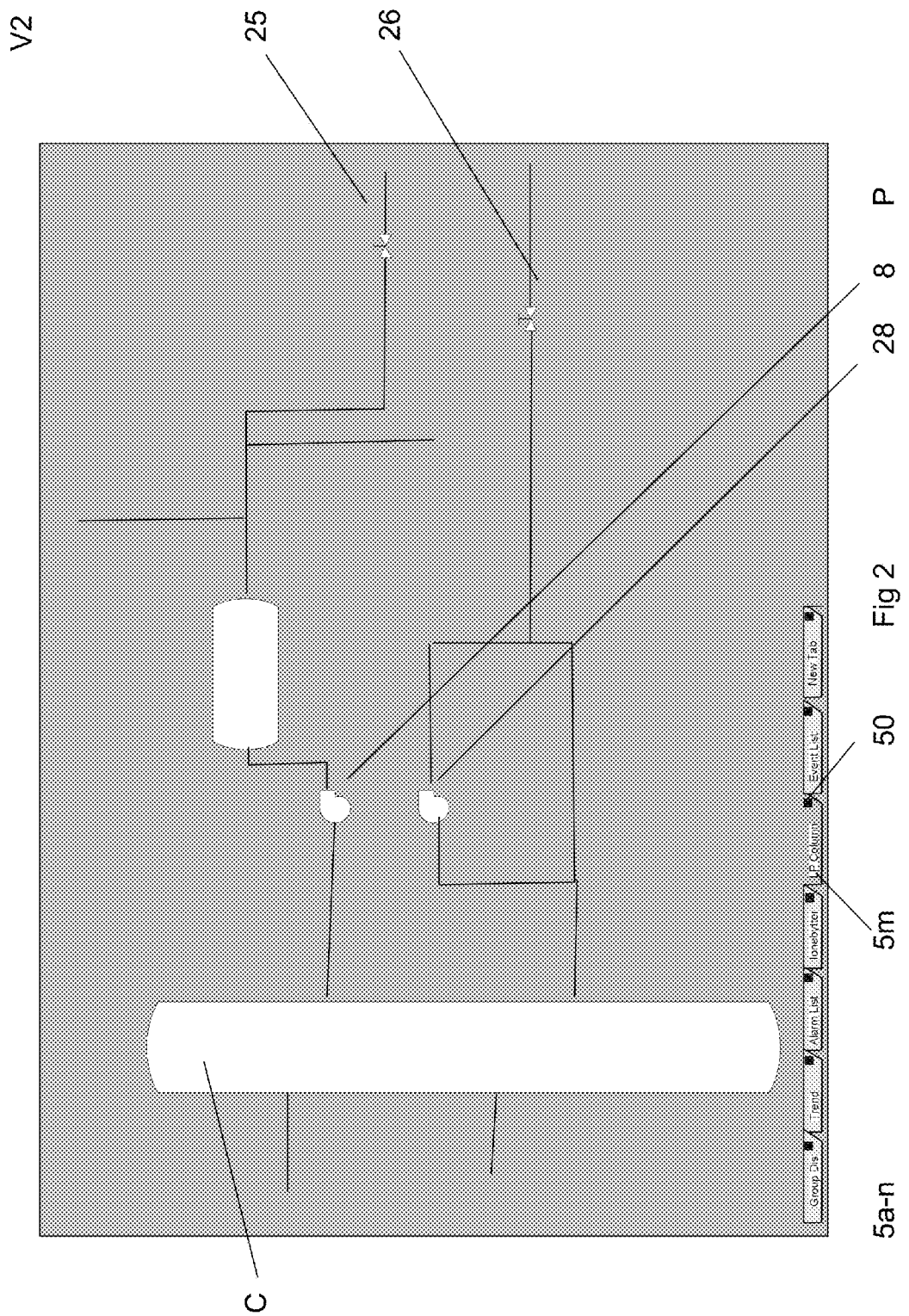
FIG. 2 shows an embodiment of an operational interface.

FIG. 2 shows an operational interface including a display V2 which in this case is a process graphic but which may as well be another type of control interface as used by an operator or other user to monitor or control a process. FIG. 2 shows a process graphic V2 which contains graphic representation of process objects such as a Low Pressure Column C, a number of pumps 8, 28 and valves 25, 26. The display window showing V2 is arranged with a number of tabs 5*a-n*, and in the example shown there are 8 tabs in total. The tab 5*m*, marked LP Column, is shown with a dark colour on this particular designated view to indicate that it is selected. The remainder of the tabs are indicated then as not selected. Each of the tabs 5*a-n*, are shown to have a close button 50, with the same close function as described in relation to FIG. 1.

Figure 3:
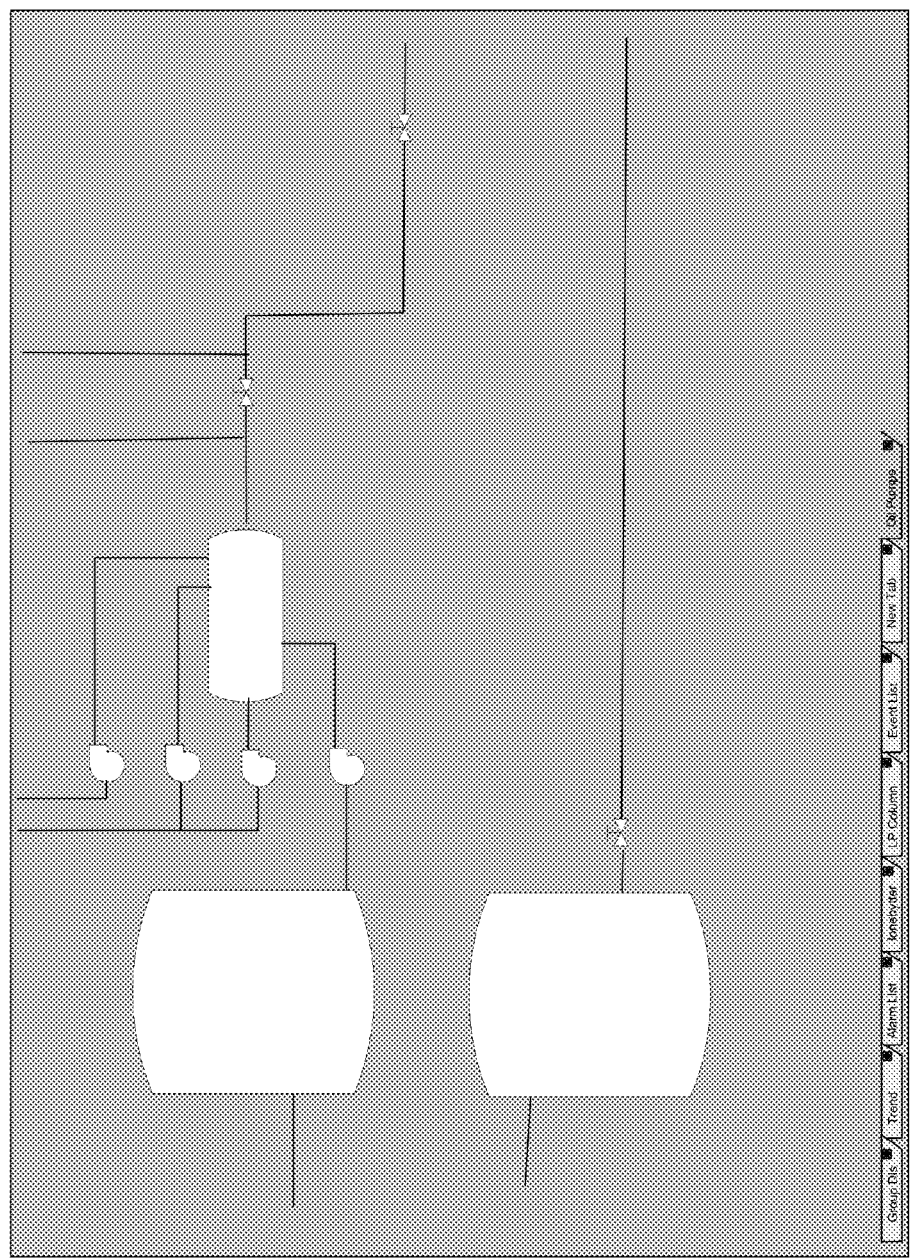
FIG. 3 shows the embodiment of the operational interface shown in FIG. 2 at a later or subsequent instance.

FIG. 3 shows a later or subsequent instance V2' of the first display V2 to illustrate how a process graphic (V2') has been opened in a new tab. The user has in this case initiated a navigation to a new process graphic, and decided that this should be opened in a new tab—as opposed to in the existing tab. The designated view is then subsequently arranged with a new tab for the new process graphic that has been opened in this session of the workplace application.

The process data necessary to provide a Process Control Interface such as V1 or V2 arranged with a designated view is kept in memory after switching by means of a tab to another view arranged with a designated view. An operator or engineer may switch between any number of tabs running in a single instance of the same workplace application to view each Process Control Interface in turn because the necessary data is held in a working or temporary memory, and does not need to be retrieved repeatedly.

When a tab is no longer needed and it closed, e.g. by clicking on the Close button on the given tab, the tab is removed from the current designated view and the process data necessary for that Process Control Interface linked to the given tab is deleted from working memory.

Figure 5:
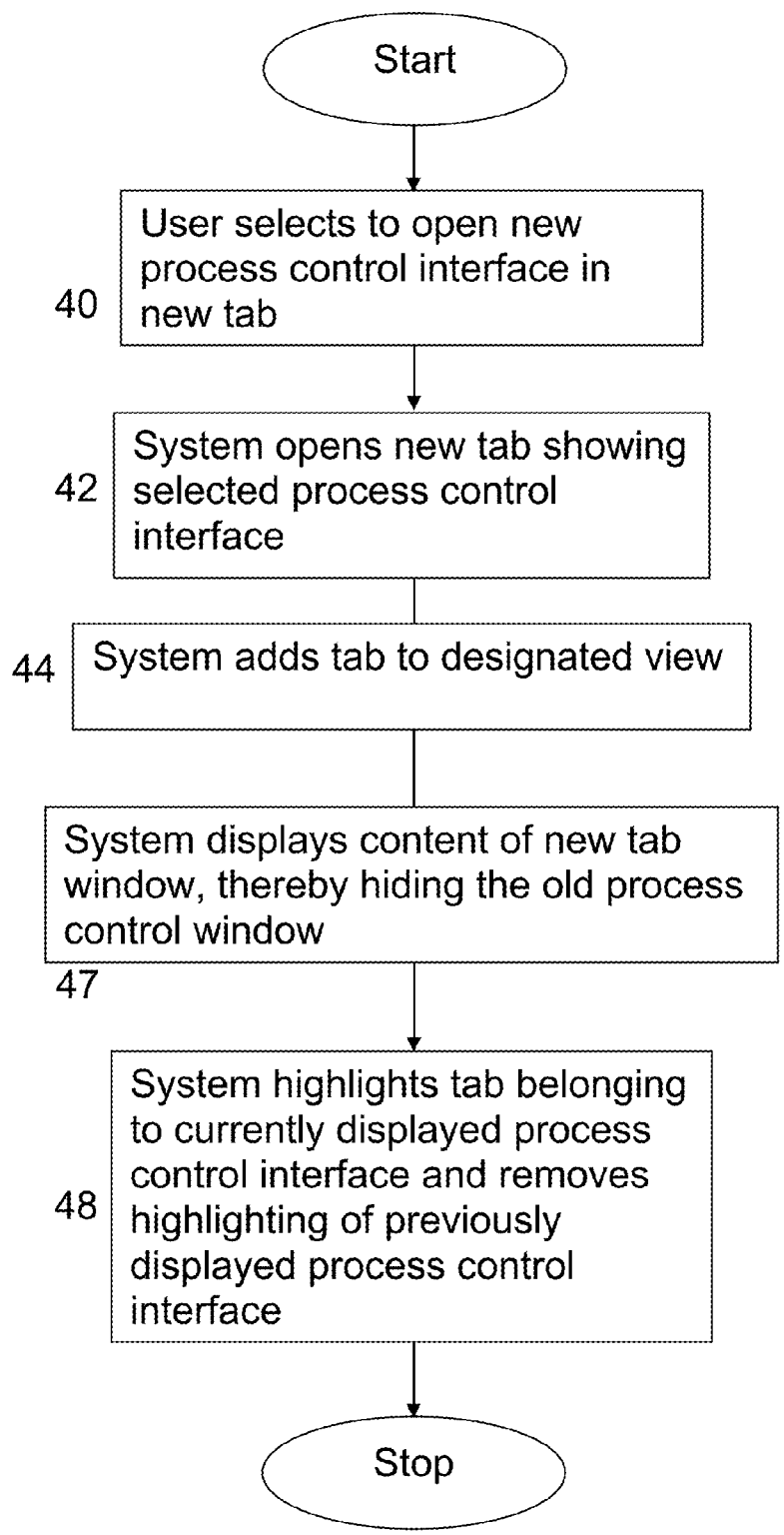
FIG. 5 is a flowchart illustrating an embodiment of a method.
Figure 6:
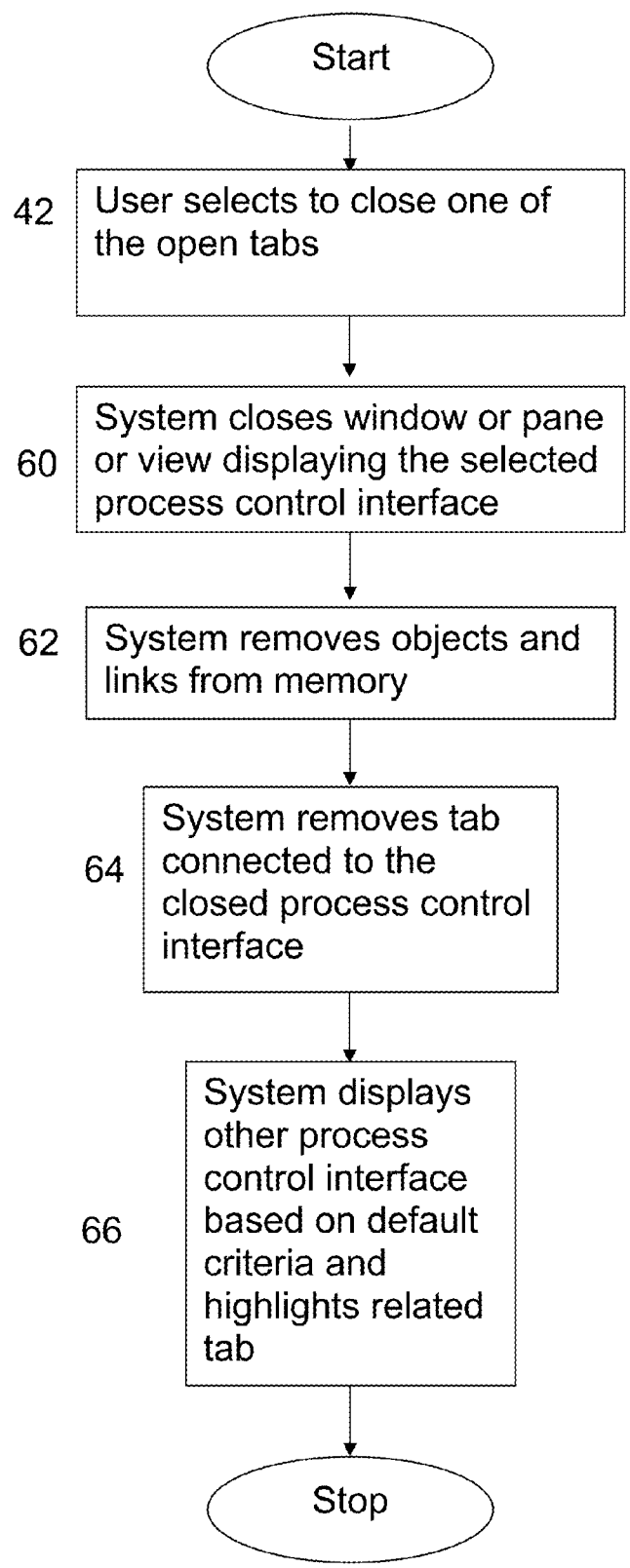
FIG. 6 is a flowchart illustrating an embodiment of closing a tab.

FIG. 5 is a flowchart of a method according to an embodiment of the invention which includes:

40 The user selects to open a new process control interface in a new tab of a designated view,

42 system opens the new tab linked to the selected process control interface in the designated view which is arranged with tabs (or other active links),

44 System adds the new tab for the selected process control interface to the designated view,

47 System displays content of new tab windows selected process control interface, thereby hiding the old process control interface,

48 System highlights tab belonging to currently displayed process control interface and removes highlighting of previously displayed process control interface FIG. 6 shows an example flowchart of the user closing a tab and thereby removing it from view and memory

42. User selects to close one of the open tabs,

60. System closes window or pane or view displaying the selected process control interface

62. System removes objects and links from memory

64. System removes tab connected to the closed process control interface

66. System displays other process control interface based on default criteria and highlights related tab Use of the inventive method and system provides a particular advantage in systems where the response time is slow—e.g. when the load time of the graphics is high. To save on operator fatigue and wasted time it is crucial to be able to handle the windows in a fast and efficient way when it is necessary to switch to several windows to check whether this is the one that is sought.

The inventive method provides system operators with a designated view capable of holding all open windows within one and the same workplace application, preferably by means of tabs. The operator can quickly assess by looking at the tabs in the designated view which windows are currently open. The operator does not have to use a Windows taskbar or similar and open the different windows each in turn. The designated view arranged with tabs or active links allows the workplace application to hold the windows in memory, thus providing an quick, easy and resource-efficient way of switching between the open windows. This is done by clicking on the tab or, if preferred, by using a keyboard command such as CTRL+TAB to switch through each of the open windows in turn. The tab arrangement of the designated view also allows the user to close the window without first opening it into view; in contrast to the usual method of opening and overlapping or replacing an existing window and, at the same time, consuming system resources to first open a window and then close it. The invention provides for at least two main types of uses of the tabs in a designated view:

a) for system engineering—the tab view allows the user to have several windows open at one time within a single instance of an "engineering workplace". The engineer works with each of a series of process control interfaces, FIG. 2, FIG. 4, A3, in the plant explorer views with A1-A2, without having to wait for graphics to load into each window. In this first use the tab view is used for system engineering in, for instance, Plant Explorer. A tab view is provided to the user at a suitable position in the application window (top, bottom, side or inside one of the windows in Plant Explorer). The tabs hold a name of the object or aspect that the view represents and has a close button on each tab, as shown in panel A of FIG. 1. Clicking on a tab will bring the respective window into view inside the same Plant Explorer application. It is also possible to switch between windows using a keyboard command such as CTRL+Tab.

b) for operation of a plant—the tab view allows the operator or other user to have several process graphics, alarm lists, trend displays, etc open at one time within a single "operator workplace". The tab view, such as a process graphic P as shown in FIG. 2 is used in operation of the system in a control system for an industrial, manufacturing or process installation, such as in the pulp & paper, oil & gas, chemistry & life sciences, or transportation industries (such as railway control systems), or even in an installation for generation, transmission or distribution of electrical energy. A tab view is provided to the user at a suitable position (bottom, side, floating) in the application window and allows the user to have several windows open at one time without having them partially overlap each other. Clicking on the tab will bring the window into view and it is also possible to close a given window by clicking on the close button on the tab. Switching windows can be done by clicking on a tab or using a keyboard command such as CTRL+Tab. This embodiment might also be viewed as a visual management of the system objects residing in memory.

That is to say that an engineer or operator may browse through all of the open windows in turn using eg CTRL+Tab to select windows for further examination or windows no longer needed that could be closed. Common to both embodiments are a pin button on the tab, a possibility to open a new tab from the current view using a keyboard command such as CTRL+T. Alternatively closing may be carried out by selecting the tab to be closed and then selecting a command from a menu item.

Figure 4:
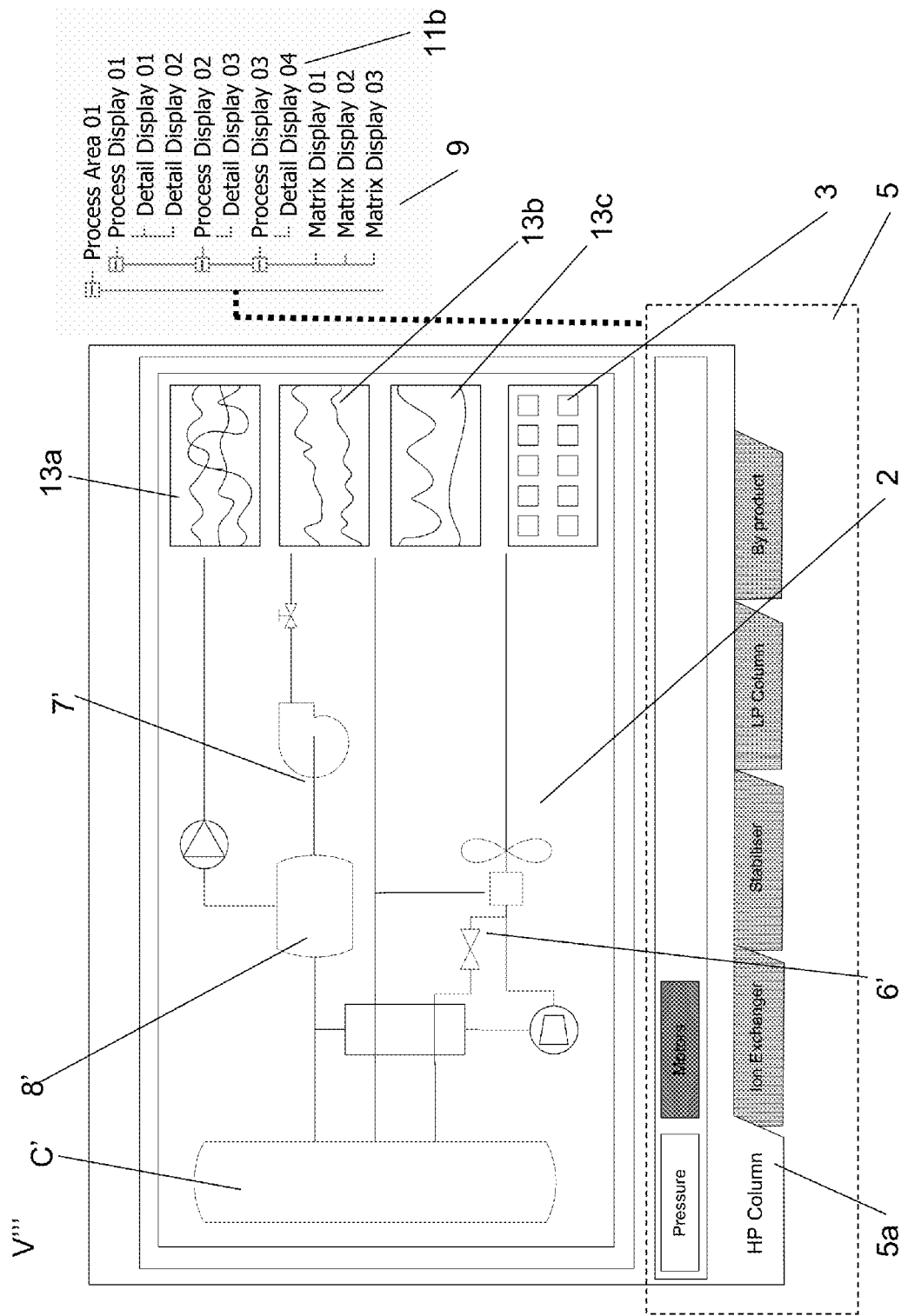
FIG. 4 show an embodiment of a user interface.

FIG. 4 shows an HMI interface 1, a user interface, with improved methods and means for navigation in a control system. The figure shows a process graphic 2 for part of a system displayed in a main view V'''. The type of view displayed is displayed in a designated view according to one aspect of the invention. The designated view comprises, as indicated by the rectangular box 50 shown with dashed lines, a tab row which is accessed by a tab, in this case tab 5a. Tab 5a is also marked with a name of a control object in the control system, in this example HP Column. Tab 5a is one of several tabs 5a-n arranged in the tab row 5 of main view V'''. The tabs 5a-n are shown arranged visible as they may be displayed on a display device 15 showing a display of a selected process graphic 2. Process graphic 2 is a member of a predetermined group 9 of process graphics. All the tabs available with a process detail view, such as Detail Display 04, indicated with reference number 11b, may belong to the same predetermined group 9 of process graphics are displayed in the tab row 5. Such a logical grouping as group 9 may be selected by a manual configuration or by a predetermined default, as the group to which one or more related process graphics belong. For example, group 9 may be from a hierarchical structure in a control system such that Process Area 01 is a software object which comprises a number of child objects, which are also software objects, Process Display 01, Process Display 02, Process Display 03, Matrix Display 01, Matrix Display 02, and Matrix Display 03. The software object Process Display 01 has two child objects, Detail Display 01 and Detail Display 02. The software object Process Display 02 has one child object, Detail Display 03, as has Process Display 03 which has child object Detail Display 04. Thus the selection of tab views in the designated view 5 shown by FIG. 4 may be based on a logical or process grouping of process graphics. The unselected tabs are indicated "unselected" in the figure as grayed or with a pattern. The process graphic 2 of FIG. 4 includes a number of visual objects or icons 6', 7', 8', each representing a function or aspect of a real world object, which real world object is controlled by software entities and software objects in the control system.

FIG. 4 also shows other graphical user interface control means such as navigation buttons at the bottom right of the display. This is shown as an area of buttons, or icons or other active types of visual graphic object in a panel 3 or in a ribbon, which provide direct access to frequently required areas, and/or functions, of the control system. For example as a button to access top level sub areas in plant, a button to click on to get to new tab view at a higher level in a structure, or a button to go to different parts of the plant. A sub panel or ribbon may also be used to select and display items such as process trends such as 13a, 13b, 13c, or to display items from process areas, other graphics, or detail graphics.

In an international application WO2006103541 A1 entitled Method and system for providing a user interface, hereby incorporated in full in this specification by means of this reference, it is described that information is presented at least in part displayed in layers or filters on one or more display screens of a control system; and that the content for the layers, which also provide an interface to a process state or function, is determined based on information available from said control system, dependent on which of the available items of said information shall be visually displayed or otherwise presented prominently, or displayed less prominently, or hidden.

In a development of a further embodiment of the present invention the feature of displaying process information distributed between layers is combined with the feature of designated views arranged with a tab. Thus for example during a particular operation, for example an optimization task, the layer function may used to select that a layer of the process graphic shall be visible or not visible. Graphic information may be generated in separate graphical layers, superimposed one on top of each other, by which one or some of the available items of said information shall be visually displayed or otherwise presented prominently, or displayed less prominently, or hidden by means of superimposing one or more layers on top of another layer. Thus a layer comprising a process flow function or a process control function or a location schema may on selection be switched display visible or not visible by means of layers. This may be arranged for different functions, engineering, configuration, maintenance, optimization or for different operations, for example start up, trouble shooting, change of operation state and so on.

Methods of the invention may be supervised, controlled or carried out by one or more computer programs. One or more microprocessors (or processors or computers) comprise a central processing unit CPU connected to or comprised in one or more of the above described control units, which processors, PLCs or computers perform the steps of the methods according to one or more aspects of the invention, as described for example for operating or controlling a system as described with reference to FIGS. 5, 6. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowcharts of FIGS. 5, 6, and/or to the graphic user interfaces of FIGS. 1-4. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, and/or on suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method for providing a user interface for an industrial control system comprising a computer and a display device and a computer implemented workplace application, said system further comprising a plurality of process control interfaces comprising one or more software objects for controlling and/or monitoring an object, controlled by said control system, and displayed on said display device, the method comprising:
  displaying in the user interface a set of said process control interfaces generated by one instance of said workplace application in a designated view, the designated view comprising a corresponding set of graphic user interface objects,
  selecting one of the graphic user interface objects, thereby displaying the corresponding process control interface and switching between a display of a first designated view comprising a first process control object interface and a display of a second designated view comprising a second process control object interface in the same instance of said workplace application;
  selecting by the user utilizing the user interface a list or group of user-selected process control interfaces or process graphics;
  saving the list or group of user-selected process control interfaces or process graphics as process control interfaces in the designated view with tabs, buttons and/or ribbons in the one instance of the workplace application;
  maintaining data of both the first designated view and a second designated view comprising the process control interfaces with tabs, links, buttons and/or ribbons loaded in a computer memory;
  switching among the interfaces or process graphics by selecting the tabs, links, buttons and/or ribbons;
  removing, on detecting a user input command to close a tab, links, buttons and/or ribbons, the process control interface from said display and removing the data of the process control interface from a computer memory; and
  closing, on detecting a user input command to switch to another process control interface, the currently open view on said display in the designated view and retaining the data of the presently closed .process control interface in computer memory such that the data of the presently closed process control interface remains in memory and comprising a link to a tab, link, button and/or ribbon arranged in another designated view.

2. The method according to claim 1, further comprising:
  displaying the first said process control interface in the designated view with a first tab, link, button and/or ribbon and a second tab, link, button and/or ribbon and,
  on detection of a keyboard command or other predetermined computer input, switching between the first or second tabs, links, buttons and/or ribbons, opening and displaying the corresponding first or second process control interface in the interface.

3. The method according to claim 1, further comprising:
  displaying the designated view comprising a plurality of tabs, links, buttons and/or ribbons each linked to another process control interface and
  switching to any of the other process control interfaces by selecting a respective one of the plurality of tabs, links, buttons and/or ribbons.

4. The method according to claim 1, further comprising:
  closing, on detecting of a GUI input to a first tab, link, button and/or ribbon or a second tab of a designated view, or equivalent user input command, the first or second process control interface from said display and removing the data of the closed first or second process control interface from computer memory.

5. The method according to claim 1, further comprising:
  on detecting a user input command directed to a link in the currently open process control interface on said display in the designated view and opening a new process control interface either inside the present window and replacing the currently open process control interface, or inside new a separate pane or view, depending on the user input.

6. The method according to claim 1, further comprising:
  selecting and opening in a designated view process control interfaces from a list of process control interfaces or process graphics arranged as designated views with tabs, links, buttons and/or ribbons to be used according to a specific work flow, or depending on system state, user input or user preferences.

7. The method according to claim 1, further comprising:
  displaying at the same time a plurality of process control interfaces arranged in the same designated view each sized in a format smaller than the complete size of said display.

8. The method according to claim 1, further comprising:
  switching a selected or active state of the plurality of process control interfaces arranged in the same designated view sized in a smaller format and displayed at the same time on said display from one process control interface to another.

9. The method according to claim 1, further comprising:
  automatically generating a designated view wherein the tabs, links, buttons and/or ribbons are generated dependent on at which position in a hierarchical structure below a software object the process graphic is arranged.

10. The method according to claim 9, further comprising:
  selecting the one or more said software objects dependent on a logical grouping in which said software object is arranged and at which level in a hierarchy the logical grouping is arranged.

11. The method according to claim 1, further comprising:
  a designated view comprising a tab or similar, further comprising a selector configured to select utilizing layers which of the available items of said information shall be visually displayed or otherwise presented prominently, or displayed less prominently, or hidden.

12. The method according to claim 1, wherein the switching is carried out on one or more display screens of a control system for monitoring an oil and gas extraction, production or processing installation, for generating and providing information in a control system of an oil or gas storage, treatment or process installation.

13. The method according to claim 1, wherein the switching is carried out for purposes of operating or engineering in a control system of an industrial automation or process installation.

14. A computer program product, comprising:
a non-transitory computer readable medium; and
computer program instructions recorded on the computer readable medium and executable by a processor for providing a user interface for an industrial control system comprising a computer and a plurality of process graphics comprising software objects for controlling and/or monitoring objects controlled by said control system, said computer program instructions making a computer or processor carry out a method comprising displaying in the user interface a set of said process control interfaces generated by one instance of said workplace application in a designated view, the designated view comprising a corresponding set of graphic user interface objects, selecting one of the graphic user interface objects, thereby displaying the corresponding process control interface and switching between a display of a first designated view comprising a first process control object interface and a display of a second designated view comprising a second process control object interface in the same instance of said workplace application, selecting by the user utilizing the user interface a list or group of user-selected process control interfaces or process graphics, saving the list or group of user-selected process control interfaces or process graphics as process control interfaces in the designated view with tabs, links, buttons and/or ribbons in the one instance of the workplace application, maintaining data of both the first designated view and a second designated view comprising the process control interfaces with tabs, links, buttons and/or ribbons loaded in a computer memory, switching among the interfaces or process graphics by selecting the tabs, links, buttons and/or ribbons, removing, on detecting a user input command to close a tab, links, buttons and/or ribbons, the process control interface from said display and removing the data of the process control interface from a computer memory, and closing, on detecting a user input command to switch to another process control interface, the currently open view on said display in the designated view and retaining the data of the presently closed process control interface in computer memory, such that the data of the presently closed process control interface remains in memory and comprising a link to a tab, link, button and/or ribbon arranged in another designated view.

15. A user interface for an industrial control system industrial control system comprising a computer and a display device and a computer implemented workplace application, said system further comprising a plurality of process control interfaces comprising one or more software objects for controlling and/or monitoring an object controlled by said control system, and displayed on said display device, the user interface comprising:
computer hardware and software arranged for displaying in the user interface a set of said process control interfaces generated by one instance of said workplace application in a designated view, the designated view comprising a corresponding set of graphic user interface objects, selecting one of the graphic user interface objects, thereby displaying the corresponding process control interface and switching between a display of a first designated view comprising a first process control object interface and a display of a second designated view comprising a second process control object interface in the same instance of said workplace application, selecting by the user utilizing the user interface a list or group of user-selected process control interfaces or process graphics, saving the list or group of user-selected process control interfaces or process graphics as process control interfaces in the designated view with tabs, links, buttons and/or ribbons in the one instance of the workplace application, maintaining data of both the first designated view and a second designated view comprising the process control interfaces with tabs, links, buttons and/or ribbons loaded in a computer memory, and switching among the interfaces or process graphics by selecting the tabs, links, buttons and/or ribbons, wherein the user interface is arranged to remove, on detecting a user input command to close a graphic user interface objects or tab, link, button and/or ribbon, the process control interface from said display and removing the data of the process control interface from a computer memory; and
computer hardware and software for closing, on detecting a user input command to switch to another process control interface, the currently open view on said display in the designated view and retaining the data of the presently closed process control interface in computer memory, such that the data of the presently closed process control interface remains in memory and comprising a link to a graphic user interface objects arranged in another designated view.

16. The user interface according to claim 15, further comprising:
computer hardware and software for displaying the first said process control interface in the designated view with a first tab, link, button and/or ribbon and a second tab, link, button and/or ribbon and, on detection of a keyboard command or other predetermined computer input, switching between the first or second tabs, links, buttons and/or ribbons, opening and displaying the corresponding first or second process control interface in the interface.

17. The user interface according to claim 15, wherein the user interface is arranged to display the designated view comprising a plurality of graphic user interface objects or tabs, links, buttons and/or ribbons each linked to another process control interface and switching to any of the other process control interfaces by selecting a respective one of the plurality of tabs, links, buttons and/or ribbons.

18. The user interface according to claim 15, wherein the user interface is arranged to close, on detecting of a graphical user interface input to a first tab, link, button and/or ribbon or a second tab, link, button and/or ribbon of a designated view, or equivalent user input command, the first or second process control interface from said display and removing the data of the closed first or second designated view from computer memory.

19. The user interface according to claim 15, further comprising:
computer hardware and software for detecting a user input command directed to a link in the currently open process control interface on said display in the designated view and opening a new process control interface either inside the present window and replacing the currently open process control interface, or inside new a separate pane or view, depending on the user input.

20. The user interface according to claim 15, further comprising:
computer hardware and software to register selection and then to open in a designated view process control interfaces from a list of process control interfaces or process graphics arranged in the designated view with graphic user interface objects or tabs, links, buttons and/or ribbons.

21. The user interface according to claim 15, further comprising:
computer hardware and software displaying at the same time a plurality of process control interfaces arranged in the same designated view each sized in a format smaller than the complete size of said display.

22. The user interface according to claim 21, further comprising:
computer hardware and software for generating a designated view comprising graphic user interface objects, a tab, link, button and/or ribbon or similar, further comprising a selector configured to select utilizing graphic information in separate graphical layers, superimposed one on top of each other, which of the available items of said information shall be visually displayed or otherwise presented prominently, or displayed less prominently, or hidden by superimposing the layers.

23. The user interface according to claim 21, further comprising:
computer program instructions configured to automatically display one or more selected tabs, links, buttons and/or ribbons, or other graphic user interface objects which are displayed dependent on a status of a process controlled by said control system, the status comprising at least one of a group of: start, run, process change, event, alarm, stop, offline, configuration or maintenance, simulation.

24. The user interface according to claim 15, further comprising:
computer hardware and software for switching a selected or active state of the plurality of process control interfaces arranged in the same designated view sized in a smaller format and displayed at the same time on said display.

25. The user interface according to claim 15, further comprising:
computer hardware and software for automatically generating a designated view wherein the graphic user interface objects, tabs, links, buttons and/or ribbons, are generated dependent on at which position in a hierarchical structure below a said software object the process graphic is arranged.

26. The user interface according to claim 15, further comprising:
computer program instructions configured to automatically display one or more selected tabs, links, buttons and/or ribbons, graphic user interface objects, dependent on a task for an operator, the task comprising at least one of a group of: start up, operate, change operation, alarm handling tasks, specific process related tasks, maintenance, shut down.

27. An industrial control system, comprising:
a user interface, a computer, a display device and a computer implemented workplace application,
a plurality of process control interfaces comprising one or more software objects for controlling and/or monitoring real world objects controlled by said control system, and displayed on said display device,
wherein the user interface comprises computer hardware and software arranged for displaying in the user interface a set of said process control interfaces generated by one instance of said workplace application in a designated view, the designated view comprising a corresponding set of graphic user interface objects, selecting one of the graphic user interface objects, thereby displaying the corresponding process control interface and switching between a display of a first designated view comprising a first process control object interface and a display of a second designated view comprising a second process control object interface in the same instance of said workplace application, selecting by the user utilizing the user interface a list or group of user-selected process control interfaces or process graphics, saving the list or group of user-selected process control interfaces or process graphics as process control interfaces in the designated view with tabs, links, buttons and/or ribbons in the one instance of the workplace application, maintaining data of both the first designated view and a second designated view comprising the process control interfaces with tabs, links, buttons and/or ribbons loaded in a computer memory, and switching among the interfaces or process graphics by selecting the tabs, links, buttons and/or ribbons, removing, on detecting a user input command to close a tab, links, buttons and/or ribbons, the process control interface from said display and removing the data of the process control interface from a computer memory, and closing, on detecting a user input command to switch to another process control interface, the currently open view on said display in the designated view and retaining the data of the presently closed process control interface in computer memory, such that the data of the presently closed process control interface remains in memory and comprising a link to a tab, link, button and/or ribbon arranged in another designated view.

28. The system according to claim 27, further comprising:
computer program instructions stored in a memory storage device or processor of the system which when run on a computer or processor carries out the steps of automatically generating a designated view wherein the tabs, links, buttons and/or ribbons are generated dependent on at which position in a hierarchical structure below a said software object the process graphic is arranged.

* * * * *